(12) United States Patent
Latvis, Jr.

(10) Patent No.: US 6,244,579 B1
(45) Date of Patent: Jun. 12, 2001

(54) LIGHT PRESS MANUFACTURED (LPM) WIRE ROPE ISOLATOR AND METHOD OF MANUFACTURE

(75) Inventor: Michael Paul Latvis, Jr., Orchard Park, NY (US)

(73) Assignee: Enidine, Incorporated, Orchard Park, NY (US)

( * ) Notice: Subject to any disclaimer, the term of this patent is extended or adjusted under 35 U.S.C. 154(b) by 0 days.

(21) Appl. No.: 09/496,688

(22) Filed: Feb. 2, 2000

(51) Int. Cl.[7] .............................. F16F 1/36; F16M 13/00
(52) U.S. Cl. ....................... 267/148; 267/166; 267/136; 29/896.93; 188/378; 248/570
(58) Field of Search ................................ 267/148, 149, 267/166, 136, 169, 160, 158, 164; 248/570, 638, 626, 636, 901, 618, 318, 628; 29/505, 896.93; 188/378

(56) References Cited

U.S. PATENT DOCUMENTS

| | | | |
|---|---|---|---|
| 3,044,759 | * 7/1962 | Kerley, Jr. ......................... | 267/148 |
| 3,360,225 | * 12/1967 | Camossi . | |
| 3,596,865 | * 8/1971 | Camossi .......................... | 267/160 |
| 4,190,227 | * 2/1980 | Belfield et al. ................... | 248/636 |
| 4,397,069 | * 8/1983 | Camossi .......................... | 29/896.93 |
| 4,783,038 | * 11/1988 | Gilbert et al. .................... | 267/148 |
| 5,062,507 | * 11/1991 | Roche ............................... | 188/378 |
| 5,169,110 | * 12/1992 | Snaith et al. .................... | 267/168 |
| 5,240,232 | 8/1993 | Loziuk . | |
| 5,277,396 | * 1/1994 | Slemmer .......................... | 267/166 |
| 5,441,243 | 8/1995 | Loziuk . | |
| 5,499,790 | * 3/1996 | Hay .................................. | 248/570 |
| 5,549,285 | 8/1996 | Collins . | |
| 5,791,636 | 8/1998 | Loziuk . | |
| 5,897,093 | * 4/1999 | LeDerf ............................. | 248/570 |
| 6,151,216 | * 11/2000 | Vos et al. ......................... | 267/148 |
| 6,164,023 | * 12/2000 | Horikiri et al. . | |

FOREIGN PATENT DOCUMENTS

| | | | |
|---|---|---|---|
| 2292152 | * | 6/1976 | (FR) . |
| 2 601 739 | | 7/1986 | (FR) . |

* cited by examiner

Primary Examiner—Douglas C. Butler
(74) Attorney, Agent, or Firm—Wall Marjama & Bilinski

(57) ABSTRACT

A wire rope isolator includes a wire rope and a pair of mounting blocks. The mounting blocks comprise of a pair of cylindrical elongated end flanges that are connected tangentially to each other by a web that has a thickness that is less than the diameter of the flanges thereby allowing the lower section of each flange to extend downward from each web. A hole passes axially through each flange. Wire rope is passed through each flange hole so that the lower surface of each web faces that of the other web and the pair of flanges of one mounting block are offset 90° to the pair of flanges of the opposing mounting block. Four U-shaped half loops of wire rope, with sufficient slack to impart elastic qualities to the wire rope, are formed. The U-shaped half loops extend outward at angles of about 45° from the mounting blocks in a cloverleaf formation. Mechanical bonds, forged by plastically deforming the extending lower sections of the flanges in each mounting block into locking contact with the wire rope, secure the wire rope and maintain the cloverleaf formation.

18 Claims, 2 Drawing Sheets

LIGHT PRESS MANUFACTURED (LPM) WIRE ROPE ISOLATOR AND METHOD OF MANUFACTURE

BACKGROUND OF THE INVENTION

1. Field of the Invention

This invention relates in general to vibrational energy isolators, and in particular, wire rope isolators. More specifically, but without restriction to the particular embodiment hereinafter described in accordance with the best mode of practice, this invention relates to wire rope vibration isolators employing a plurality of U-shaped half loops in a wire rope or a number of wire ropes that flex during use so as to dispel vibrational energy.

2. Background of the Prior Art

Excessive vibrational energy can damage and/or cause the deterioration of sophisticated machinery. In industries in which movement is inherent in daily operations, such as avionics and shipping, the need to minimize unwanted vibrational energy is imperative. These industries have come to rely heavily on sensitive electronic equipment, like navigational computers, to maintain daily operations. Constant jostling of electronic equipment can cause system failures that lead to costly downtime to replace and/or repair the damaged equipment.

Over the years, many devices have been designed to contain damaging vibrations and dampen unwanted kinetic energy. These devices use the unwanted kinetic energy to move simple machinery, like pistons and springs, so as to divert the unwanted energy from shock-sensitive equipment attached to the isolator. A good example of a member of this class of devices is the wire rope isolator. The most common wire rope isolators employ a helical wire cable secured between a pair of retaining members. When the isolator is in use, vibrational energy causes the wire rope coil to move in a spring-like fashion, which in turn moves the retaining members vertically toward each other. This movement drains the vibrational energy before it reaches the affixed sensitive equipment.

The art of wire rope vibration isolators has been contributed to by a number of proposed devices detailed in U.S. Pat. No. 5,549,285 issued to Collins and U.S. Pat. Nos. 5,441,243 and 5,791,636 both issued to Loziuk. These patents describe vibrational energy isolators that consist of coiled wire ropes secured between two parallel retaining bars. Holes drilled into the retaining bars maintain the helical shape of the wire rope. Vibrational energy causes the wire rope coil to contract which in turn moves the entrapment bars vertically relative to each other thus absorbing vibrational energy in the process.

There are several drawbacks, however, with the helical design. First, conventional isolators are ineffective when the support load is a few pounds. Further, because helical wire rope isolators are intended to support heavier loads, the components of these isolators are manufactured from stronger more solid materials like steel which tends to be more costly than less sturdier metals like aluminum. In addition, the assembly of wire rope isolators requires a tool to wind the wire rope and the another to secure the wire coil by either fastening or crimping. This factor, coupled with the need to use more expensive materials, increases the costs associated with the production of helical wire rope isolators. Finally, in addition to aforementioned limitations, helical wire rope isolators are also not well suited for applications with limited spatial requirements due to the requirement that the wire coil be of a certain length to be functional.

A type of wire rope isolator not employing a wire rope coil is described in French Patent No. 2,601,739 issued to Le Derf et al. This wire rope isolator consists of a pair of entrapment bars in which a singular wire rope is manipulated into a "saddle" formation. Two pairs of parallel U-shaped half loops are formed that are parallel to the axis of one of the retaining bars. When in use, the U-shaped half loops flex and contract causing the retaining bars to move vertically relative to each other. This design, however, can lack uniform stiffness on all axes.

Accordingly, there continues to be a need for wire rope isolators that can support relatively light loads, are constructed from less costly materials, require limited steps in manufacturing, can be used when space is limited and provide uniform stiffness about all axes of the isolator.

SUMMARY OF THE INVENTION

It is, therefore, an object of the present invention to improve energy absorption devices.

Another object of the present invention is to produce a wire rope isolator that does not utilize a wire rope with a spiral formation but still retains elastic properties inherent in the spiral formation.

It is a further object of the present invention to produce a wire rope isolator that has a simpler design than conventional isolators.

Still another object of the present invention is to design a wire rope isolator for use in capabilities with spatial limitations.

It is yet a further object of the present invention to construct a wire rope isolator suited to support relatively light masses.

An additional object of the present invention is to manufacture wire rope isolators using cost effective materials.

Yet a further objective of the present invention is to develop a method of manufacturing a wire rope isolator using a singular tool.

Still yet another object of the present invention is to design a wire rope isolator with uniform stiffness on all axes of the isolator.

These and other objects are attained in accordance with the present invention of a wire rope vibration isolator that includes a pair of mounting blocks spaced apart by a singular wire rope or a number of wire ropes manipulated into a cloverleaf pattern about the pair of mounting blocks. According to one aspect of the present invention, each mounting block consists of a pair of elongated flanges attached tangentially to a flat web. The elongated flanges have a depth that is greater than the width of the flat web. When the flanges are connected to the web, so that the top surface of the web is coplanar with the top surface of each flange, a lower section of each flange extends below the surface of the web. The flanges run the length of the flat web, are parallel to each other, and are of equal dimensions. Holes extend axially through each flange. The isolator is assembled by first passing a singular wire rope through a flange hole of a mounting block. After the rope is passed completely through the flange of one block, it arcs outward and into the flange hole directly across from it on the opposing mounting block forming a U-shaped half loop between the mounting blocks. The wire rope is then passed completely through the flange hole of this mounting block, is arced outward again, and passed through the empty flange hole of the first mounting block. This process is repeated until the wire rope passes through all the flanges forming four U-shaped half loops arranged in a cloverleaf formation about the mounting blocks. Each U-shaped half loop extends outward from the mounting blocks at an angle of preferably 45°, although other degree measurements are possible so long as the rope exhibits uniform stiffness characteristics about all axes of mounting blocks. A compressing force applied to each mounting block secures the lower sections of the flanges into locking contact with the wire rope contained within. The U-shaped half loops formed remain elastically deformable allowing vertical movement of the mounting blocks to dissipate vibrational energy.

The cloverleaf formation can also be achieved using a plurality of ropes.

BRIEF DESCRIPTION OF THE DRAWINGS

Further objects of the present invention together with additional features contributing thereto and advantages accruing therefrom will be apparent from the following description of a preferred embodiment of the invention which is shown in the accompanying drawing with like reference numerals indicating like components throughout, wherein.

DETAILED DESCRIPTION OF THE INVENTION

Figure 1:
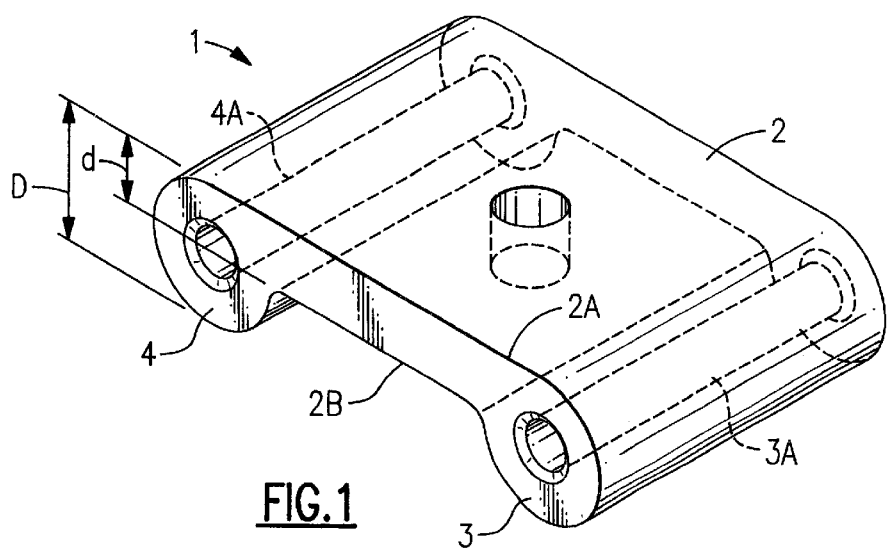
FIG. 1 is a perspective view of one embodiment of the mounting block for a wire rope isolator.

FIG. 1 shows the wire rope isolator mounting block 1 in accordance with the present invention. The mounting block consists of a flat web 2 having a top surface 2A and a bottom surface 2B. A pair of elongated flanges 3 and 4 are tangentially connected to the web so that the top surface 2A of the web is coplanar with the top surface of each flange 3 and 4. Each flange 3 and 4 has a depth (D) that is greater than the width (d) of the web 2 so that the lower section of each flange 3 and 4 extends below the bottom surface 2B of the web 2. In the embodiment of this invention represented by FIG. 1, the ratio of the flange diameter to the web diameter is 2:1, however, different ratios are possible so long as the lower portion of the flange extends below the lower surface of the web. The lower portions of the end flanges form an extension below the bottom surface of the web. In the embodiment illustrated in FIG. 1, semi-circular extensions are formed, however, non-circular configurations are possible. The mounting block, as described above, is ideally produced by extrusion so as to lower manufacturing costs.

Each of the flanges 3 and 4 contains at least one hole 3A and 4A that passes axially therethrough. The holes of each flange should be of a sufficient diameter to allow a wire rope to pass therethrough. In the shown embodiment, the flange holes are cylindrical and the diameters of said holes 3A and 4A are half the depth of the flanges 3 and 4. In other embodiments, either the flange, the hole or both may be non-cylindrical. In still other embodiments, the diameter of the holes need not be half the depth of the corresponding flange. A chamfer or radius may be situated at the entrance and exit of the flange holes.

Figure 2:
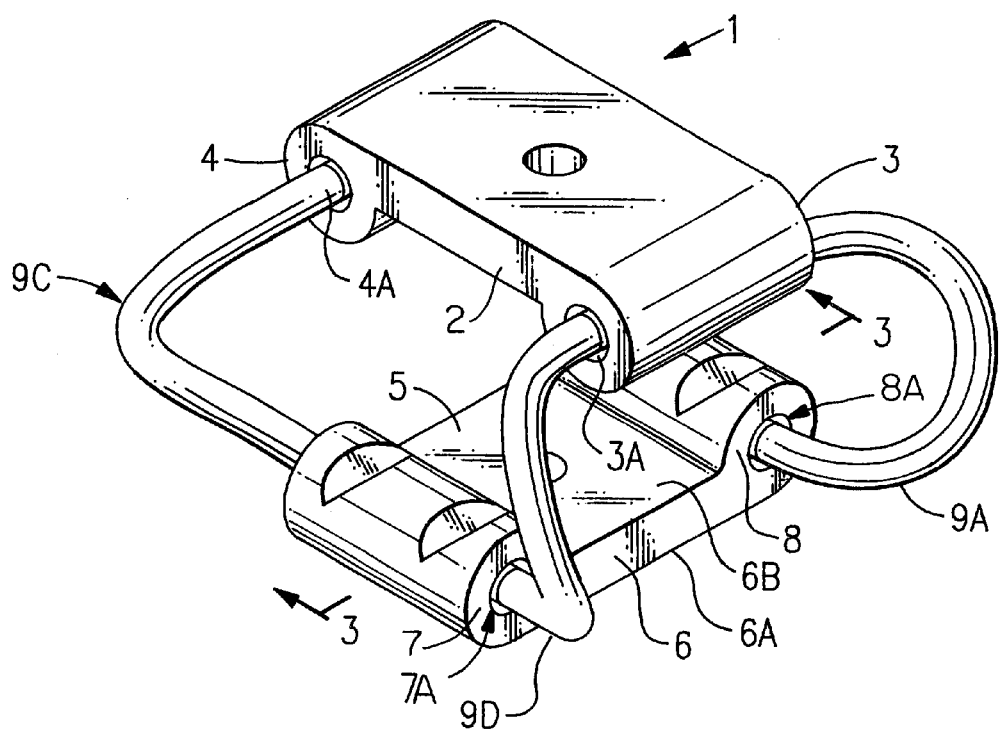
FIG. 2 is a perspective view of one embodiment of a wire rope vibration isolator according to the present invention.

FIG. 2 shows an elevated side view of the assembled wire rope isolator in accordance with the present invention. The isolator consists of an upper mounting block 1 and a lower mounting block 5 of a design consistent with that represented by FIG. 1 and described at length previously. The upper mounting block 1 includes a pair of parallely elongated end flanges 3 and 4 and similarly the lower mounting block 5 includes a pair of elongated end flanges 7 and 8. In the represented embodiment, both mounting blocks 1 and 5, including web 2 and 6 and end flanges 3, 4, 7 and 8 of each respective block, have equivalent dimensions, however, this is not a requirement of the present invention.

The bottom surfaces 2B and 6B of each mounting block 1 and 5 are situated so that end flanges 3 and 4 of the upper mounting block 1 are offset 90° from end flanges 7 and 8 of the lower mounting block 5. The end of a wire rope 9 is positioned in one flange hole of one of the mounting blocks. It should be noted that end of the wire rope can be located in any of the four flange holes. To assist in describing the construction of this invention, it is assumed that an end of the wire rope 9 is located in hole 3A of elongated end flange 3. The wire rope 9 is manipulated so as to form a U-shaped half loop 9A that extends outwardly from the mounting block at an angle of 45° relative to the horizontal planes of the mounting blocks 1 and 5. The U-shaped half loop 9A is formed with ample slack so as to possess elastic properties. The wire rope 9 is then manipulated into the entrance of the flange hole directly across from the exit of the flange hole that the wire rope previously passed through. In the illustrated example, the wire rope exits hole 3A, arcs outward, then enters hole 8A of flange 8 of the lower mounting block 5. The wire rope 9 is then passed completely through hole 8A and is looped outward toward flange hole 4A of the upper mounting block 1. U-shaped half loop 9B (not shown) is formed. After entering hole 4A and passing therethrough, the wire rope is again arced outward to flange 7 of the lower mounting block 5 creating U-shaped half loop 9C. The wire rope passes through hole 7A, is looped outward forming U-shaped half loop 9D. The terminal end of the wire rope 9 is positioned in hole 3A. The U-shaped half loops formed should extend outwardly from the horizontal planes of the mounting blocks at 45° angles, however, other angles are possible. When completed, the wire rope will be in a "cloverleaf" formation about the mounting blocks. The flanges 3, 4, 7 and 8 are then crimped in one or more than one locations to form mechanical bonds (not shown) that secure the wire rope and maintain the cloverleaf formation.

Figure 3:
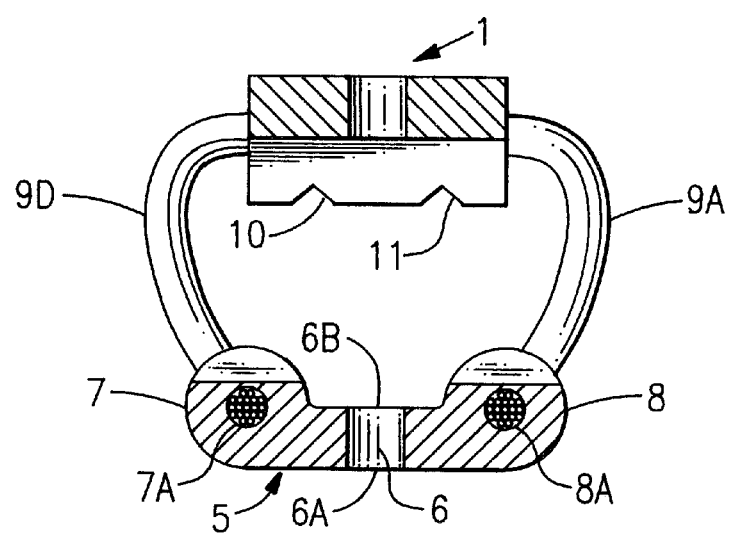
FIG. 3 is a cross-sectional view of a wire rope vibration isolator taken along line 3 of FIG. 2.

FIG. 3 illustrates a cross-sectional side view of the assembled wire rope isolator from a perspective along axis 3 of FIG. 2. Crimps 10 and 11 of the upper mounting block I are created when a sufficient force is applied to the mounting blocks 1 and 5 so as to plastically deform the lower sections of the flanges 3, 4 and 7, 8 into locking contact with the wire rope 9. At each indentation, mounting block 1 has been crimped forming a mechanical bond between the mounting block 1 and the wire rope 9. U-shaped half loops 9A and 9D arc outwardly at 45° angles from the vertical plane of the mounting blocks 1 and 5. The cross sectional view of mounting block 5 shows end flanges 7 and 8 with holes 7A and 8A passing axially therethrough. Web 6 with top surface 6A and bottom surface 6B connects elongated end flanges 7 and 8. Wire rope 9 has been passed through both flanges 7 and 8. Crimps 12 and 13 securing the wire rope 9 to lower mounting block 5 are not shown in this perspective. When construction is completed, the U-shaped half loops 9A, 9B, 9C and 9D flex outwardly and contract inwardly relative to the mounting blocks 1 and 5 allowing the mounting blocks 1 and 5 to move vertically relative to each other so as to dissipate vibrational energy in the process.

Figure 4:
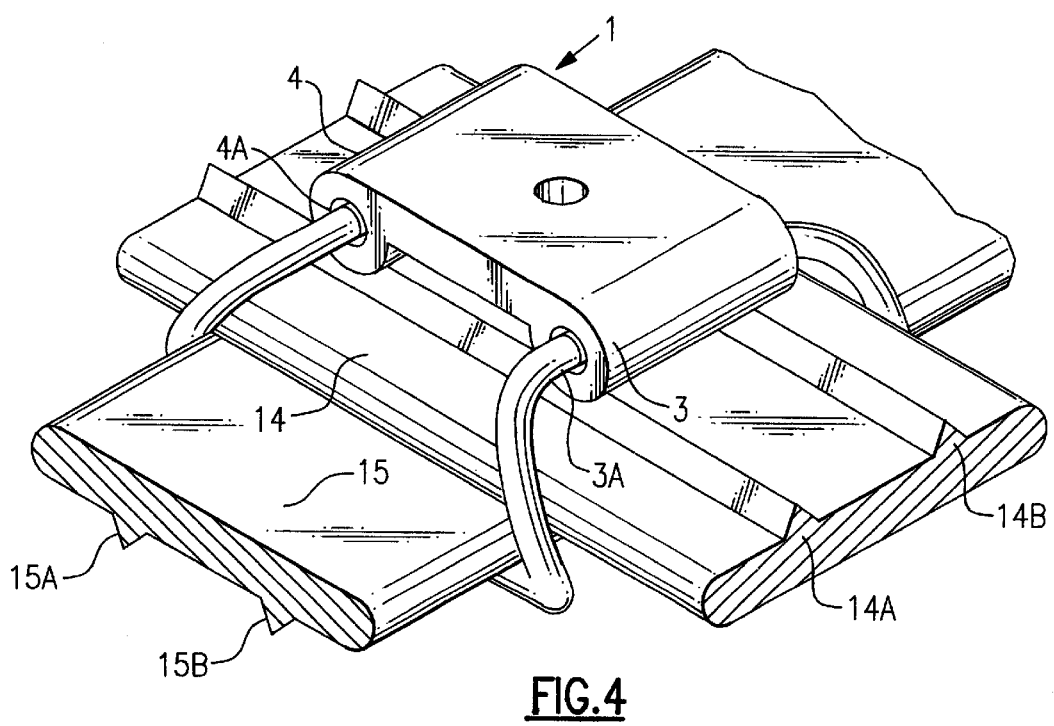
FIG. 4 is an away side elevation view of a crimping press with the isolator positioned thereon in accordance with the method of the present invention.

FIG. 4 illustrates the crimping process that creates the wire rope isolator. Fixture bar 14 has raised rails 14A and 14B and fixture bar 15 has raised rails 15A and 15B. In the illustrated embodiment of the present invention, the fixture bars 14 and 15 are relatively rectangular, although other shapes are possible, with a top side and a bottom side. The rails 14A, 14B, 15A and 15B have a raised triangular cross section and are located on only one side of each fixture bar 14 and 15 although it is possible to form raised rails with a different geometry. The fixture bars 14 and 15 are affixed to each other perpendicularly with the flat side of each fixture bar 14 and 15 against the other.

After the wire rope has been assembled as described above, the upper and lower mounting blocks 1 and 5 (not shown) are positioned about fixture bars 14 and 15, respectively, so that the end flanges 3 and 4 of block 1 and 7 and 8 of block 5 are perpendicular to the raised rails of the fixture bar 14 or 15 situated directly across from it. In the illustrated example, the bottom surface 2B of mounting block 1 is positioned so that the lower sections of flanges 3 and 4 face the raised rails 14A and 14B of the upper fixture bar 14. Once positioned, a force of sufficient magnitude is applied to both mounting blocks 1 and 5 so as to compress each block against the rails of the opposing fixture bar to plastically deform the elongated end flanges 3 and 4 (7 and 8 are not shown) into locking contact with wire rope 9 contained therein. Mechanical bonds are formed between the mounting blocks 1 and 3 and the wire rope 9 which hold the rope in place and maintain the cloverleaf formation. If constructed properly, the U-shaped half loops 9A, 9B, 9C and 9D of the described invention retain an elastic quality allowing outward flexing and inward contracting when in use. It is possible to assemble the wire rope isolator and crimp the wire rope using the same tool.

It is also desirable to include in at least one flange hole, an internal vertical web to block the wire rope from passing completely through the hole contained in the flange. This "blind hole" aligns the free end of the wire rope. It is highly desirable that the mechanical bond between the mounting block and the wire rope not be formed at either end of the wire rope. If the free end of the wire rope is too close to the crimp, the quality of the isolator is compromised. The internal vertical web indicates the position of the end of the wire rope preventing possible crimping of either end of the rope. If the crimp securing the wire rope is located on the end of the wire rope, it is possible that the wire rope can be pulled out of the mounting block during use.

While this invention has been described in detail with reference to a certain preferred embodiment and preferred method for making the illustrated embodiment, it should be appreciated that the present invention is not limited to those precise embodiments. Rather, in view of the present disclosure which describes the best mode for practicing the invention, many modifications and variations would present themselves to those of skill in the art without departing from the scope and spirit of this invention, as defined in the following claims.

What is claimed is:

1. A mounting block for a wire rope isolator that includes:
   a flat web having a top surface and bottom surface and a width (d);
   a pair of elongated end flanges mounted at opposite ends of said web so that said top surface of said web is coplanar with the top surface of each flange;
   each flange has a depth (D) that is greater that the width (d) of the web so that a lower section of each flange extends below the bottom surface of said web; and
   each flange containing a hole passing axially therethrough so that wire rope can pass into and through said hole, each hole penetrating the lower section of said flange whereby mechanically deforming the lower section of each flange will lock the flange to the wire rope contained in said hole.

2. The mounting block of claim 1 wherein said opposed flanges and the axial holes of each flange are cylindrical.

3. The mounting block of claim 1 wherein each flange contains a chamfer at the exit and entrance of each axial hole.

4. The mounting block of claim 1 wherein each flange contains a radius at the exit and entrance of at least one axial hole.

5. The mounting block of claim 1 wherein at least one flange hole contains an internal vertical web so as to position the end of the wire rope.

6. A wire rope isolator that includes:
   a pair of opposed mounting blocks;
   each mounting block further including a web having a top and a bottom surface and a width (d), a pair of flanges mounted on opposite ends of said web, each flange having a depth (D) that is greater that the width of the web, the top surface of the web being coextensive with the top surfaces of the flanges so that the lower section of each flange extends downwardly beneath the surface of the web;
   each flange having a hole passing axially therethrough that penetrates the lower section of the flange;
   wire rope passing into and through said holes to space the blocks apart; and
   at least one crimp formed in the bottom section of each flange so as to lock the wire rope to the flange.

7. The wire rope isolator of claim 6 wherein said flanges on one block are turned 90° to those on the opposing block and wire rope is passed between said blocks to form a plurality of U-shaped half loops between the blocks.

8. The wire rope isolator of claim 6 wherein each flange and the axial holes of each flange are cylindrical.

9. The wire rope isolator of claim 6 wherein each flange contains a chamfer at the exit and entrance of each axial hole.

10. The wire rope isolator of claim 6 wherein each flange contains a radius at the exit and entrance of each axial hole.

11. The wire rope isolator of claim 6 wherein at least one flange hole contains an internal vertical web so as to align an end of the wire rope.

12. A method of constructing a wire rope isolator that includes the steps of:
   forming a mounting block by attaching elongated flanges along opposing ends of a web so that the lower section of each flange extends downwardly beneath the bottom surface of the web;
   passing holes axially through each of the flanges;
   placing two mounting blocks in spaced apart alignment so that the flanges on one block are perpendicular with the flanges on the other block and the lower section of the flanges on one block face the lower sections of the flanges on the other block;
   passing wire rope into and through the holes in said flanges to create a series of U-shaped half loops between the blocks; and
   compressing the block against the raised ribs of a crimping fixture with sufficient force to crimp said lower sections of said flanges into locking contact with wire rope contained within each of said flanges.

13. The method of claim 12 wherein each flange and the axial holes contained therein is cylindrical.

14. The method of claim 12 wherein said raised ribs have a triangular cross section.

15. The method of claim 12 wherein said flanges on one block are turned 90° to those on the opposing block and wire rope is passed between said blocks forming a plurality of U3 shaped half loops of wire rope about the mounting blocks.

16. The method of claim 12 wherein each flange contains a chamfer at the exit and entrance of each axial hole.

17. The method of claim 12 wherein each flange contains a radius at the exit and entrance of each axial hole.

18. The method of claim 12 comprising the additional step of aligning the free ends of the wire rope with an internal vertical web positioned in at least one axial hole of at least one flange so that the crimp formed is not located at either end of the wire rope.

* * * * *